United States Patent [19]
Rapp

[11] 3,935,019
[45] Jan. 27, 1976

[54] GLASSES AND GLASS-CERAMICS

[75] Inventor: James Erich Rapp, Oregon, Ohio

[73] Assignee: Owens-Illinois, Inc., Toledo, Ohio

[22] Filed: Feb. 12, 1974

[21] Appl. No.: 441,790

Related U.S. Application Data

[60] Continuation-in-part of Ser. No. 349,152, April 9, 1973, abandoned, which is a division of Ser. No. 241,448, April 5, 1972, Pat. No. 3,852,077.

[52] U.S. Cl. ............................. 106/47 R; 252/635
[51] Int. Cl.² ......................................... C03C 3/00
[58] Field of Search ............... 106/47 R, 47 Q, 39.6; 252/63.5

[56] References Cited
UNITED STATES PATENTS

| | | | |
|---|---|---|---|
| 2,701,208 | 2/1955 | Blau | 106/47 R |
| 3,029,152 | 4/1962 | Milne | 106/47 Q |
| 3,607,789 | 9/1971 | Murthy | 106/47 R |
| 3,615,757 | 10/1971 | Herczog | 106/52 X |
| 3,785,834 | 1/1974 | Rapp | 106/47 R |

OTHER PUBLICATIONS

Imaoka, et al. Report of the Institute Industrial Science Mar. 1969 (pp. 161–193) 19(3) "Three Component System Glass Formation Range II – $\alpha$ – Group Elements Germanato System."

*Primary Examiner*—Winston A. Douglas
*Assistant Examiner*—John F. Niebling
*Attorney, Agent, or Firm*—Charles S. Lynch; E. J. Holler

[57] ABSTRACT

Thermally crystallizable glasses are disclosed of the system:

$$RO - Nb_2O_5 - GeO_2$$

wherein RO is a BaO or SrO. Also disclosed are thermally crystallizable glasses of the system $PbO - Nb_2O_5 - GeO_2$. Glass-ceramics made from these glass systems have high dielectric constants and low dissipation factors or loss tangents, which glasses and glass-ceramics are suitable for use as capacitors and dielectrics, and particularly for thick-film dielectric pastes utilized in the manufacture of micro-electronic printed circuits. By varying the heat treatment schedule for crystallization of the glass to a glass-ceramic, a specific high dielectric constant coming within a prescribed range can be imparted to the finished glass-ceramic.

5 Claims, No Drawings

GLASSES AND GLASS-CERAMICS

REFERENCE TO RELATED APPLICATIONS

This application is a continuation-in-part of copending application Ser. No. 349,152 filed Apr. 9, 1973 now abandoned; which in turn is a division of copending application Ser. No. 241,448 filed Apr. 5, 1972 now U.S. Pat. No. 3,852,077, the entire disclosures of both copending applications are relied on herein.

Glasses of the $BaO - Nb_2O_5 - GeO_2$, $SrO - Nb_2O_5 - GeO_2$ and $PbO - Nb_2O_5 - GeO_2$ system in selected proportions have been found to have desirable properties from the standpoint of transparency and stability and are useful for a wide variety of purposes. Of particular interest is the finding that these glasses can be heat treated to produce transparent glass-ceramics having an index of refraction higher than that of the glass and which specifically may be in excess of 2.000. The glass-ceramics which are capable of being formed from glasses within the above-described glass system have high dielectric constants; e.g. in excess of 50 and low dissipation factors; e.g. about 3.5% or less. Both transparent and non-transparent or opaque glass-ceramics may be obtained in accordance with this invention possessing the aforementioned desirable properties.

Because they have been found to have excellent dielectric properties, including high dielectric constants and very low dielectric losses, the glass-ceramics produced in accordance with the present invention are suitable for use in a variety of electrical devices, such as capacitors, electroluminescent cells, wave guides, thick-film dielectric pastes for microelectronic printed circuits and the like.

Thermally crystallizable glasses of the above-specified systems can, during an appropriate heat treatment process, be converted to a transparent, inorganic crystalline oxide ceramic material having any desired dielectric constant between a selected upper and lower limit. The ceramic material thus formed, also known as a glass-ceramic, contains a major portion of very tiny crystals embedded in a minor glassy matrix remaining as a result of the thermal crystallization.

Glass-ceramics of the present invention can also be prepared in the form of small chips, of a size of about one-fourth inch or less, which are suitable for use as support carriers for electronic microcircuits. Chip capacitors are produced by casting, pressing and metallizing/heat treating in a continuous operation. Such capacitors are of the general purposes or high-frequency/positive temperature coefficient. Dielectric constants are in the range of 50 or more and the dissipation factor is preferably less than 3.5% and usually less than 1% with the temperature coefficient of capacitance being positive or negative.

Glasses coming within the foregoing $RO - Nb_2O_5 - GeO_2$ system and capable of producing the aforementioned properties in glass-ceramics made therefrom consist essentially of the following:

| Ingredient | Mole Percent |
|---|---|
| $GeO_2$ | 39 – 52 |
| $Nb_2O_5$ | 27 – 41 |
| RO | 16 – 26 | wherein the molar ratio of $Nb_2O_5$ to RO is from about 1.3:1 to about 2:1 and RO is either SrO, or BaO. When the molar ratio of $Nb_2O_5$ to RO is 3:1, no glasses can be formed from the mixture.

Glasses coming within the $PbO - Nb_2O_5 - GeO_2$ system and capable of producing the aforementioned properties in glass-ceramics made therefrom consist essentially of the following:

| Ingredient | Mole Percent |
|---|---|
| $GeO_2$ | 35 – 60 |
| $Nb_2O_5$ | 19 – 35 |
| PbO | 16 – 35 | wherein the molar ratio of $Nb_2O_5$ to PbO is from about 0.9:1 to about 1.5:1.

The following compositions were prepared.*

*In forming the glass melts of the compositions, the batch materials consisted of $GeO_2$, $Nb_2O_5$ and PbO, charged as the oxides, while SrO and BaO were charged as strontium carbonate and barium carbonate, respectively.

TABLE I

| Ingredient | Composition in Mole Percent | | | | | | |
|---|---|---|---|---|---|---|---|
| | 1 | 2 | 3 | 4 | 5 | 5 | 7 |
| $GeO_2$ | 42.9 | 42.9 | 42.9 | 42.9 | 40.0 | 40.0 | 40.0 |
| $Nb_2O_5$ | 42.8 | 35.7 | 42.8 | 35.7 | 30.0 | 30.0 | 30.0 |
| BaO | — | — | 14.3 | 21.4 | — | 30.0 | — |
| PbO | — | — | — | — | 30.0 | — | — |
| SrO | 14.3 | 21.4 | — | — | — | — | 30.0 |
| Glass Stability | ● | ⊖ | ● | ⊛ | ⊗ | ⊖ | ⊗ |
| Index of Refraction of Glass | | 2.043 | | 2.123 | 2.043 | 2.002 | 2.002 |

Legend: Glass Forming Tendency
 ⊖ Stable enough to draw rods
 ⊗ Good: Quenched plates could be obtained having no uncontrolled devitrification
 ⊛ Fair: Quenched plates could be obtained having some uncontrolled devitrification, usually occurring in isolated areas
 ◐ Poor: Quenched plates had only small areas of glass
 ● No glass formation Glasses were formed in compositions 2, 4, 5, 6 and 7. No glass could be formed with compositions 1 and 3. Compositions 2, 4 and 5 were subjected to the heat treatments as set forth in Table II. All compositions were subjected to a gradient heat treatment which involves subjecting the sample to a gradient of 900° to 1700°F. for 2 hours. This temperature range covers the range of crystallization temperature. In this way it can be determined at what temperature the glass will crystallize; whether it will form a transparent glass-ceramic or whether it will form any glass-ceramic at all. Compositions 6 and 7 were subjected to a gradient heat treatment but no glass-ceramic could be formed. The gradient heat treatment is an evaluation of the capability of the glass to form glass-ceramics and is determinative of the suitable or optimum condition required to achieve crystallization of glass compositions.

TABLE II

| Glass-Ceramic Properties Heat Treatment | Compositions 2 | 4 | 5 |
|---|---|---|---|
| Temp.°F (time, hour) | 1375 (2) (transparent) | 1500 (2) (opaque) | 1335 (2) (transparent) |
| Index of Refraction $n_D$ | | | 2.103 |
| Dielectric Constant (R.T.*, 0.5 MHz) | 90.3 | 67.7 | |
| Dissipation Factor % (R.T., 0.5 MHz) | 0.25 | 0.06 | |
| Heat Treatment Temp.°F (time, hour) | 1335 (2) (transparent) | 1200 (2) (transparent) | 1350 (2) (transparent) |
| Index of Refraction $n_D$ | 2.115 | 2.134 | |
| Dielectric Constant (R.T., 0.5 MHz) | | 187 | 85 |
| Dissipation Factor % (R.T., 0.5 MHz) | | 0.74 | 0.25 |
| Heat Treatment Temp.°F (time, hour) | 1250 (2) 1450 (½) (transparent) | 1250 (2) (transparent) | |
| Index of Refraction $n_D$ | 2.108 | | |
| Dielectric Constant (R.T., 0.5 MHz) | 89.9 | 153 | |
| Dissipation Factor % (R.T., 0.5 MHz) | 0.3 | 0.4 | |
| Heat Treatment Temp.°F (time, hour) | 1285 (2) 1550 (¼) (transparent) | 1335 (2) (opaque) | |
| Dielectric Constant (R.T., 0.5 MHz) | 64.3 | 258 | |
| Dissipation Factor % (R.T., 0.5 MHz) | 0.1 | 1.1 | |

*R.T. stands for room temperature.

Additional compositions were prepared as shown in Table III, hereinafter. The symbols used to indicate glass forming tendency have the same meaning as shown in Table I.

formed (compositions 8, 9, 10 and 13 to 17) were subjected to the heat gradient furnace as described hereinabove. No transparent ceramic material could be formed with compositions 14 and 15.

The remaining compositions 8, 9, 10, 13, 16 and 17

TABLE III

| Ingredient | Composition in Mole Percent | | | | | | | | | |
|---|---|---|---|---|---|---|---|---|---|---|
| | 8 | 9 | 10 | 11 | 12 | 13 | 14 | 15 | 16 | 17 |
| $GeO_2$ | 40 | 38 | 50 | 43 | 37 | 50 | 45 | 48 | 45 | 55 |
| $Nb_2O_5$ | 40 | 35 | 30 | 37 | 38 | 30 | 25 | 29 | 27.5 | 22.5 |
| BaO | — | 27 | 20 | — | — | — | — | — | — | — |
| PbO | — | — | — | 20 | 25 | 20 | 30 | — | 27.5 | 22.5 |
| SrO | 20 | — | — | — | — | — | — | 23 | — | — |
| Glass Stability | ⊛ | ⊖ | ⊖ | ● | ● | ⊖ | ⊖ | ⊖ | ⊗ | ⊗ |
| Index of Refraction of glass | 2.12 | — | 1.99 | — | — | — | 2.115 | 1.99 | 2.115 | 2.09 |

In the foregoing Table, compositions 11 and 12 could not be formed into a glass. All glasses that could be were subjected to the indicated heat treatment in Table IV below:

TABLE IV

| Glass-Ceramic Properties | Compositions | | | | | |
|---|---|---|---|---|---|---|
| | 8 | 9 | 10 | 13 | 16 | 17 |
| Heat Treatment Temp.°F, (hours) | 1450(2) | 1500(2) | 1250(2) 1400(¼) | 1300(2) | 1125(2) 1300(¼) | 1150(2) 1400(¼) |
| | (transp.) | (opaque) | (transp.) | (transp.) | (transp.) | (transp.) |
| Index of Refraction $n_D$ | 2.13 | | 2.03 | | 2.12 | 2.1 |
| Dielectric Constant (R.T., 0.5 MHz) | 88.3 | 132 | 70.6 | 147 | 262 | 78.8 |
| Dissipation Factor, % (R.T., 0.5 MHz) | 0.28 | 1.7 | 0.35 | 0.74 | 0.9 | 1.1 |
| Heat Treatment Temp.°F(hours) | 1450(2) 1550(¼) | | 1250(16) 1400(¼) | 1550(2) | 1400(2) | 1150(2) 1500(¼) |
| | (transp.) | | (transp.) | (opaque) | (opaque) (white) | (trans-) (lucent) |
| Index of Refraction, $n_D$ | | | 2.03 | | | |
| Dielectric Constant (R.T., 0.5 MHz) | 85.9 | | 87.9 | 373 | 294 | 54.3 |
| Dissipation Factor % (R.T., 0.5 MHz) | 0.8 | | 0.33 | 1.3 | 1.4 | 0.4 |
| Heat Treatment Temp.°F,(hours) | 1700(2) | | 1500(16) | | 1125(2) 1600(¼) | 1450(2) |
| | (opaque) | | (opaque) | | (opaque) | (opaque) |

TABLE IV-Continued

| Glass-Ceramic Properties | Compositions | | | | | |
|---|---|---|---|---|---|---|
| | 8 | 9 | 10 | 13 | 16 | 17 |
| Dielectric Constant (R.T., 0.5 MHz) | 89.3 | | 161 | | 81.5 | 144 |
| Dissipation Factor % (R.T., 0.5 MHz) | 3.3 | | 0.7 | | 0.2 | 1 |
| Heat Treatment Temp. °F,(hours) | | | 1575(2) (opaque) | | | |
| Dielectric Constant (R.T., 0.5 MHz) | | | 146 | | | |
| Dissipation Factor % (R.T., 0.5 MHz) | | | 0.2 | | | |

The foregoing Tables show that there exists an interrelationship between proportions of ingredients and molar ratios. Illustratively, composition 1 with 14.3 mole percent SrO, which is outside the claimed range fails to form a glass. The BaO containing compositions parallel the SrO compositions. For example, sample 3 with 14.3 mole percent BaO also failed to form a glass. Also, compositions 6 and 7 wherein the ratio of $Nb_2O_5$ : RO is outside the range, could not be formed into transparent or opaque glass-ceramics. Composition 9, which is just outside the claimed upper limit for BaO content could only be formed into an opaque glass-ceramic.

For the lead oxide containing compositions it developed that the behavioral characteristics were quite different from the RO containing composition. For instance, composition 5, similar in ratios and proportions to composition 6 (BaO) and 7 (SrO) could be heat treated to form a transparent glass-ceramic having good electrical properties whereas compositions 6 and 7 did not form a glass-ceramic.

Also, compositions 14 and 15, which fell inside the compositional limitations, but outside the molar proportion limitations did not form transparent glass-ceramics.

While the glasses and glass-ceramics of the invention have been discussed in terms of the sole essential ingredients, it will be evident to those skilled in the art that minor amounts, preferably not more that 10% and most preferably no more than 5% by weight of other metal oxides which are compatible with the glass and glass-ceramic compositions can be used. Care should be taken, however, to insure that such other metal oxides do not materially affect the basic characteristics of the glasses and glass-ceramics of the present invention, including the high dielectric constants and dissipation factors and high indices of refraction.

I claim:

1. A thermally crystallizable glass suitable for crystallization to a glass-ceramic having good dielectric properties and an index of refraction in said glass-ceramic in excess of 2.000 and higher than the index of refraction of said glass, said glass consisting essentially of the following composition:

| Ingredient | Mole Percent |
|---|---|
| $GeO_2$ | 35 – 60 |
| $Nb_2O_5$ | 19 – 35 |
| PbO | 16 – 35 | wherein the molar ratio of $Nb_2O_5$ to PbO ranges from about 0.9:1 to about 1.5:1.

2. A glass-ceramic body having good dielectric properties including a dielectric constant in excess of 50 (Room temperature 0.5 MHz) and a dissipation factor of less than 2%, said glass-ceramic body being formed by thermal in situ crystallization of a glass body consisting essentially of the following composition:

| Ingredient | Mole Percent |
|---|---|
| $GeO_2$ | 39 – 52 |
| $Nb_2O_5$ | 27 – 41 |
| RO | 16 – 26 | wherein said RO is SrO or BaO and the molar ratio of said $Nb_2O_5$ to said RO is from about 1:3 to about 2:1.

3. A glass-ceramic body having good dielectric properties including a dielectric constant in excess of 50 (Room temperature 0.5 MHz) and a dissipation factor of less than 2%, said glass-ceramic body being formed by thermal in situ crystallization of a glass body consisting essentially of the following composition:

| Ingredient | Mole Percent |
|---|---|
| $GeO_2$ | 35 – 60 |
| $Nb_2O_5$ | 19 – 35 |
| PbO | 16 – 35 | wherein the molar ratio of $Nb_2O_5$ to PbO ranges from about 0.9:1 to about 1.5:1.

4. A transparent glass-ceramic body having an index of refraction in excess of 2.000, said glass-ceramic body being formed by thermal in situ crystallization of a glass body having a lower index of refraction and consisting essentially of the following composition:

| Ingredient | Mole Percent |
|---|---|
| $GeO_2$ | 39 – 52 |
| $Nb_2O_5$ | 27 – 41 |
| RO | 16 – 26 | wherein said RO is SrO or BaO and the molar ratio of said $Nb_2O_5$ to said RO is from about 1:3 to about 2:1.

5. A transparent glass-ceramic body having an index of refraction in excess of 2.000, said glass-ceramic body being formed by thermal in situ crystallization of a glass body having a lower index of refraction and consisting essentially of the following composition:

| Ingredient | Mole Percent |
|---|---|
| $GeO_2$ | 35 – 60 |
| $Nb_2O_5$ | 19 – 35 |
| PbO | 16 – 35 | wherein the molar ratio of $Nb_2O_5$ to PbO ranges from about 0.9:1 to about 1.5:1.

* * * * *